July 26, 1955  J. BOUVAT-MARTIN  2,714,027
LINK OF ADJUSTABLE LENGTH, PARTICULARLY
FOR USE AS AN ADJUSTOR
Filed Sept. 20, 1949  2 Sheets-Sheet 1

INVENTOR
JEAN BOUVAT-MARTIN
BY *Robert E. Burns*
ATTORNEY

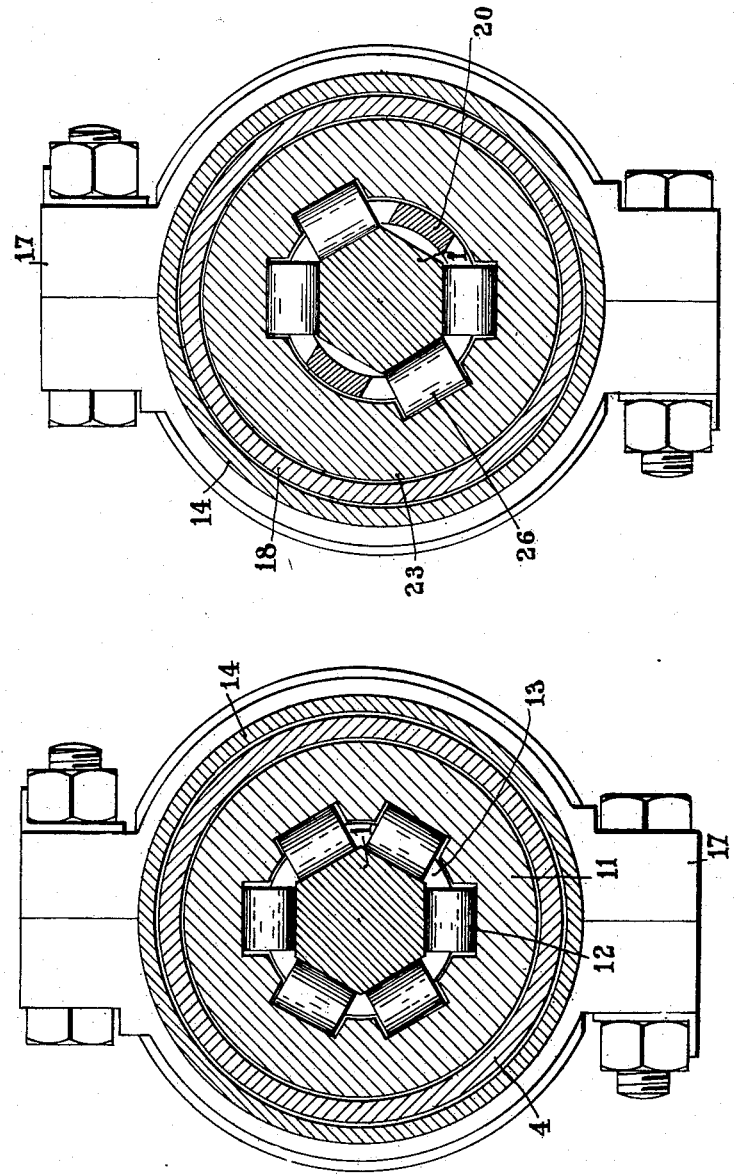

United States Patent Office 2,714,027
Patented July 26, 1955

2,714,027

LINK OF ADJUSTABLE LENGTH, PARTICULARLY FOR USE AS AN ADJUSTOR

Jean Bouvat-Martin, Paris, France, assignor to Societe Generale Isothermos, Paris, France Application September 20, 1949, Serial No. 116,769

5 Claims. (Cl. 287—58)

This invention relates to an adjustor which is capable of lengthening or shortening under various conditions and which is particularly adapted for use in the brake systems of railroad vehicles.

The adjustor of the invention includes a sheath which may be slidably shifted with reference to an adjustor rod when one end of the sheath is urged rearwardly against the action of a spring, whereby the adjustor is adapted to operate in one of the following ways:

When the sheath is in its inoperative position, the adjustor remains rigid and resists any tractional stress, however great, and it also remains rigid under compressional stresses.

When the sheath is shifted slightly with reference to the adjustor rod against the action of the spring, the adjustor remains rigid against tractional stresses only when tractional stresses are exerted which are lower than a predetermined value, whereas the rod moves when said tractional stresses rise beyond said predetermined value.

When the sheath is shifted to a substantial extent against the action of its spring away from its inoperative position with reference to the adjustor rod, the return of the sheath into its original position under the action of this spring results in a shortening of the adjustor by a distance equal to the shifting of the sheath away from its original position with reference to the rod.

A preferred embodiment of the invention will be described with reference to the accompanying drawings wherein, Figures 1 and 1A together is a longitudinal sectional view of the adjustor;

Figure 2 is an enlarged transverse sectional view taken along the line 2—2 in Fig. 1;

Figure 3 is a transverse sectional view taken along the line 3—3 in Fig. 1.

Figure 1:
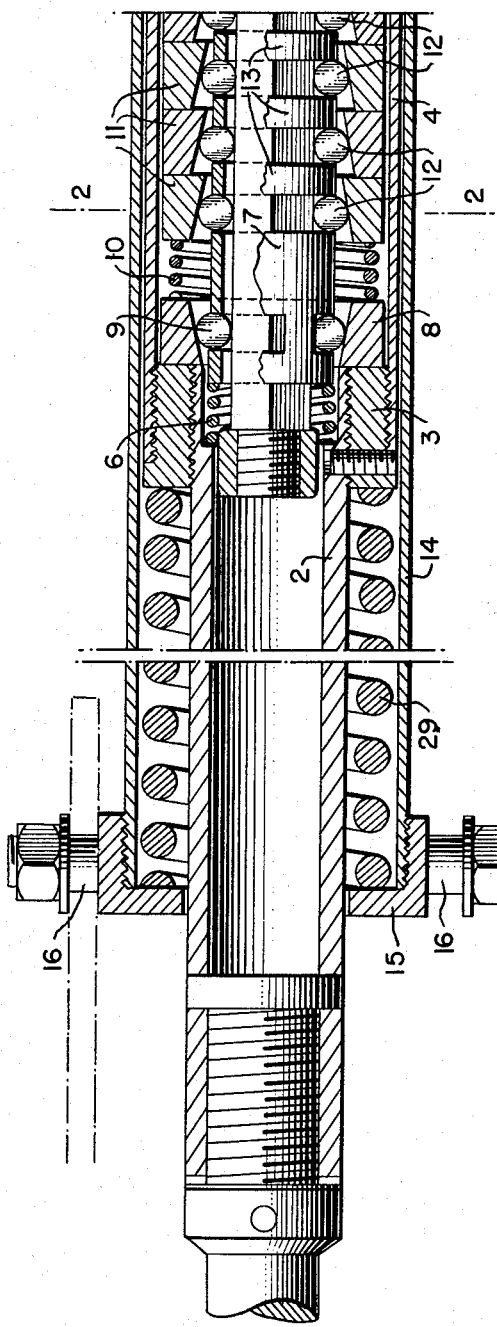
Figure 1A:
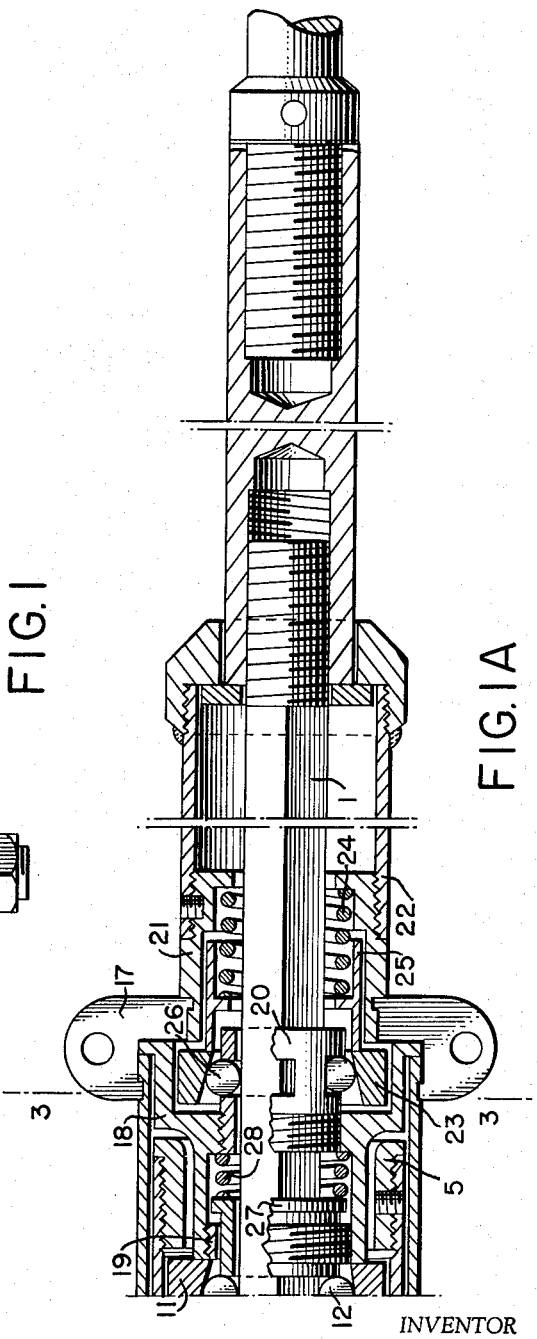

The adjustor of the invention shown in the drawings comprises a six-sided prismatic adjustor rod 1 slidably engaging a tubular member 2 which is provided at its right hand end as seen in Fig. 1 with an extension comprising three members rigidly connected to it, viz.; a ring 3, a sleeve 4 and a second ring 5. This rigid assembly (hereinafter referred to as the "adjustor body") provides a housing in which are received as seen from left to right in Figure 1, a spring 6, a roller-guiding cage 7, a race 8 for rollers 9, a spring 10, races 11 for rollers 12 and spacing rings 13. The rollers 9 are arranged between the faces of the prismatic rod 1 and the corresponding inner faces of the sloping race 8, the faces in the latter being inclined in such a direction that, owing to the wedging action of the rollers 9 between the prismatic rod 8 and the race faces, the rod is prevented from moving toward the left inwardly in the tubular member 2 and consequently the adjustor is prevented from shortening. Advantageously, for the purpose of stiffening the roller-guiding cage 7, a smaller number of apertures may be provided therein than there are sides on the prismatic rod 1. Thus, in the embodiment illustrated, only two apertures are provided in cage 7, each aperture being adapted to receive a pair of rollers, whereby only four rollers are accommodated in the cage and these engage four of the six side faces of the prismatic rod illustrated.

The rollers 12 are separated merely by spacing rings 13 and are positioned between the plane faces of the prismatic rod 1 and the plane faces in the so-called lock races 11, the latter faces being inclined in such a direction that the wedging of the rollers 12 between the same and the opposed faces of the prismatic rod will prevent the latter from moving towards the outside (to the right as shown in Fig. 1) i. e. will counteract lengthening of the adjustor. The number of stop races provided depends upon the magnitude of the pulling forces which the adjustor is required to resist.

The adjustor further comprises a rigid so-called movable system composed of a housing or sheath 14, a ring cap 15 screwed thereon, a pair of fork-guiding pins 16, a coupling strap 17, a sleeve 18, a screw ring 19, a roller-guiding cage 20, a ring 21 and a sleeve 22.

Slidably received in the sleeve 18 of the movable system thus formed is the so-called take-up race 23 which is urged continuously toward the left as shown in Fig. 1 by a calibrated spring 24, the force of which is transmitted to take-up race 23 through a ring 25. The other end of spring 24 rests against the end inner flange of ring 21.

Positioned between the plane faces of prismatic rod 1 and the oblique faces of take-up race 23 which slope in the same direction as the faces of races 11, are rollers 26.

Pressed against the outer surfaces of the end set of rollers 12, which are at the right as shown in Figure 1, is a so-called unlocking tubular push ring 27 which is loaded by a spring 28 which rests against a portion of sleeve 18. The displacement of the push ring 27 towards the races 11 is limited by the ring 19 which is screwed on the sleeve 18.

A strong return spring 29 rests at one end on ring cap 15 and at its other end upon ring 3. This spring tends to move the housing 14, together with the entire assembly rigid therewith toward the left with respect to the hollow rod 2 and to the whole adjustor body rigid therewith.

A compression force exerted upon the adjustor illustrated in Fig. 1 tends to cause the prismatic rod 1 to enter the tubular rod 2 and consequently to shorten the adjustor. The rollers 26 and 12 provide no resistance to such a sliding movement by reason of the direction of sloping of the outer races 23 and 11 carrying them so that the prismatic rod 1 could be moved inside the tubular rod 2 from the right hand side towards the left hand side of Fig. 1. But the case is not the same with respect to rollers 9 as the spring 28 is stronger than the spring 6 and consequently rollers 9 are urged in the direction of expansion of the spring 28 against the corresponding inner surface of the race 8 through the cooperative action of the roller-guiding cage member 7, the rollers 12, the rings 13, and of the pusher member 27 positioned around the prismatic rod 1 between the two springs 6 and 28. The rollers 9 are thus wedged rigidly against their race 8 and they prevent the prismatic rod 1 from sliding inside the tubular member 2 in the direction of shortening of the adjustor.

When the adjustor is considered in the position illustrated in Fig. 1, it is apparent that the spring 29 urges leftward the races 11 against the rollers 12 through the cooperative action of the bottom member or ring cap 15, the sheath 14, the coupling strap 17, and the sleeve 18. Consequently, if a tractional force is exerted on the elements 1 and 2 of the adjustor which is less than the power of the spring 29, the rollers 12 are wedged inside the races 11 and the prismatic rod 1, transmitting a tensional stress on the races 11 through the agency of the rollers 12, urges races 11 towards the left hand flange of the sleeve 18 but without producing any shifting of the latter. If the tractional effort exerted on the rod 1 is greater than the power of the spring 29, the thrust exerted by the races 11 on the left hand flange of the sleeve 18 produces a receding movement of the sleeve through a shifting towards the right of the system which is rigid with the ring cap 15 of the sheath, this movement stopping as soon as the races 11 bear against the left hand flange of the ring 5. Under such conditions, the adjustor has increased in length by a distance equal to the clearance separating, in the arrangement of Fig. 1, the left hand surface of the ring 5 from the right hand surface of the race 11 which lies at the extreme right of the system of races.

This length is negligible insofar as the use of the adjustor rod is concerned, and after assuming this stretched position, the adjustor resists, without further extension, any tractional stress however high it may be, since the wedging of the rollers 12 on the races 11 is now complete, the ring 5 forming a rigid bearing for the races 11. When the bottom or ring cap 15 is shifted slightly by a force toward the right exerted upon it, this cap and all the parts rigid with it are shifted toward the right hand side of Fig. 1 with reference to the tubular rod 2, and the wedging of the races 11 against the rollers 12 which, effected by the action of the sleeve 18, is released. The races 11 are then submitted solely to the action of the spring 10 which urges them towards the right hand side, while the rollers 12 are submitted to the differential action of the springs 6 and 28 which urges them towards the left hand side, since the spring 28 is stronger than the spring 6. There is consequently no possibility of the rollers 12 being wedged inside the races 11 since they are resiliently urged in the direction opposite to the wedging direction and these rollers no longer oppose the sliding movement of the prismatic bar 1 outwardly of the tubular rod 2 when the adjustor is being stretched. The rollers 9, which engage the sloping race 8 which has a slope in a direction opposite to the slope of the lock races 11, also do not oppose such a sliding movement. But the prismatic rod 1 is prevented from sliding by the rollers 26, the take-up race 23 being urged into wedging direction over said rollers by the ring 25 and the spring 24 bearing against the bottom of the ring 21. The sliding movement of the prismatic bar 1 inside the tubular rod 2 in the direction of elongation may, therefore, be produced whenever the tractional effort exerted on the rod rises above the elastic wedging stress of the rollers 26, which wedging stress depends primarily upon the power of the spring 24.

When a thrust is exerted on the bottom member 15 for shifting the sheath 14, and the parts rigid therewith, toward the right hand side of Fig. 1 by a distance which is greater than the clearance shown in the position illustrated in Fig. 1 between the right hand side of the ring 19 and the left hand side of the collar on the pusher member 27, the pusher member is shifted towards the right against the action of the spring 28, which becomes inoperative and no longer bears on the rollers 12. Rollers 12, thus released, are then submitted solely to the action of the spring 6 through the agency of the rings 13 and the roller guiding cage 7, and they are consequently wedged against their races 11, which in turn bear firmly against the left hand surface of the screwed ring 5 against which they are urged by the spring 10. The rod is thus completely rigid in the direction of elongation. If the bottom member 15 is then released, it enters, under the action of the spring 29, the inoperative position illustrated in Fig. 1 with reference to the tubular rod 2. During this return movement from right to left relative to the tubular member 2, the ring cap 15 carries with it the parts that are integral therewith and in particular the sheath 14, coupling strap 17, the ring 21, the sleeve 18 and the roller guiding cage 20 screwed into said sleeve. The calibrated spring 24 bearing against the forward portions of the ring 21, pushes the ring 25 against the take-up race 23, and the rollers 20 enclosed in the roller guiding cage 26 are thus wedged between the faces of said take-up race 23 and the faces of the prismatic rod 1. Since the surfaces of the take-up race 23 are inclined in a direction such that the wedging of the rollers 26 opposes sliding movement of the prismatic rod 1, toward the right relative to the rollers 26, said rollers, thus wedged, tend to carry the prismatic rod 1 toward the left along with the ring cap 15 and the members integral therewith. Sliding movement of the prismatic rod 1 toward the left relative to the tubular member 2 is not prevented by the rollers 9 and 12, because during such movement, the rollers 12 are subjected to a frictional force by the prismatic rod 1 tending to unlock said rollers from the lock races 11, and the spring 28 is compressed by the pusher member 27 which is engaged by the screw ring 19. The spring 28 hence does not push toward the left on the roller guiding cage 7. The cage 7 is therefore subjected only to the force of friction exerted by the prismatic rod 1 on the rollers 12 and to the opposing of the spring 6. The action of the spring 6 overcomes the force of friction and is directed toward the right so as to unlock the rollers 9 and thus permit the prismatic rod 1 to slide toward the left relative to the tubular member 2 without any resistance other than a slight force of friction. When the ring cap 15 and the elements integral therewith have returned, under the action of spring 29, to the position shown in Fig. 1 in which the sleeve 18 comes to rest with its left hand end engaging the right hand surface of the lock races 11, the adjustor is thus shortened a length equal to the displacement of the ring cap 15 toward the right relative to the tubular member 2, from the moment the screw ring 19 engages the collar of the pusher member 27.

Further, it will be appreciated that any displacement by a few millimeters of the movable system that contains the housing 14 towards the right, as shown in the drawing, with respect to the adjustor body that is rigid with the tubular rod 2 will be effective to unlock the adjustor and to make it capable of shortening or lengthening.

What I claim is:

1. A link of adjustable length, namely for use as an adjustor, said link comprising a tubular rod having a forward end, a cylindrical hollow body rigidly secured to said forward end and coaxial with the tubular rod, said hollow body having a rearward bottom and a forward circular inwardly turned flange encircling a large circular axial aperture of said hollow body, a prismatic rod having a head slidably engaged in the tubular rod and extending, axially in the hollow body and outwardly through the circular aperture of the hollow body, a roller guiding cage, slidably mounted around the prismatic rod and carrying rollers in engagement with the face of the prismatic rod, a sloping race slidably mounted in the hollow body, opposite said rollers and having inner forwardly diverging faces engageable with the rollers, a first spring bearing on the forward end of said tubular rod and urging the roller guiding cage forwards, a plurality of spaced apart spacing rings, slidably mounted around the prismatic rod, on the forward side of the roller guiding cage, a set of rollers in engagement with the faces of the prismatic rod, in each of the spaces between said spacing rings, lock races slidably mounted in the hollow body, each opposite to one of the sets of rollers and having inner rearwardly diverging faces engageable with the rollers of said sets, a second spring located in the hollow body between the bottom of said hollow body and the lock races and urging said lock races away from said sloping race, a sheath having an apertured bottom slidably engaged around the tubular rod and a cylindrical wall slidably engaged around the hollow body and having a forward circular edge extending beyond the circular inwardly turned flange of the hollow body, a sleeve rigid with said forward circular edge, the prismatic rod extending axially in and protruding forwardly beyond the sleeve, the sleeve having a rearwardly projecting tubular extension facing the lock races, a coil spring mounted inside the sheath, around the tubular rod and having a forward end bearing on the bottom of the hollow body and a rearward end pushing the bottom of the sheath rearwardly in respect to the hollow body and urging the rearwardly projecting tubular extension of the sleeve against the lock races, telescopic resilient means mounted in the sleeve around the prismatic rod, protruding rearwardly of the tubular extension and engaging a set of the rollers of the lock races and binding means mounted in the sleeve, around the prismatic rod and resisting any rearward sliding movement of the sleeve along the prismatic rod.

2. A link of adjustable length, namely for use as an adjustor, said link comprising a tubular rod having a forward end, a cylindrical hollow body rigidly secured to said forward end and coaxial with the tubular rod, said hollow body having a rearward bottom and a forward circular inwardly turned flange encircling a large circular axial aperture of said hollow body, a prismatic rod having a head slidably engaged in the tubular rod, and extending, axially in the hollow body and outwardly, through the circular aperture of the hollow body, a roller guiding cage, slidably mounted around the prismatic rod and carrying rollers in engagement with the faces of the prismatic rod, a sloping race slidably mounted in the hollow body, opposite said rollers and having inner forward by diverging faces engageable with the rollers, a first spring bearing on the forward end of said tubular rod and urging the roller guiding cage forward, a plurality of spaced apart spacing rings, slidably mounted around the prismatic rod, on the forward side of the roller guiding cage, a set of rollers in engagement with the faces of the prismatic rod, in each of the spaces between said spacing rings, lock races, slidably mounted in the hollow body, each opposite one of the sets of rollers and having inner rearward by diverging faces engageable with the rollers of said sets, a second spring located in the hollow body, between the sloping race and the lock races and urging said lock races away from said sloping race, a sheath having an apertured bottom slidably engaged around the tubular rod and a cylindrical wall slidably engaged around the hollow body and having a forward circular edge extending beyond the circular inwardly turned flange of the hollow body, a sleeve rigid with said forward circular edge, the prismatic rod extending axially in and protruding beyond the sleeve, the sleeve having a rearwardly projecting tubular extension terminated in an end facing the lock races, a coil spring mounted inside the sheath, around the tubular rod and having a forward end bearing on the bottom of the hollow body and a rearward end pushing the bottom of the sheath rearwardly in respect to the hollow body and urging the end of the rearwardly projecting tubular extension of the sleeve against one of the lock races, a screw ring rigidly engaged with and inside said end and having a forward side radially inwardly of the tubular extension, a tubular push member, slidably mounted around the prismatic rod, having a rearward edge facing rollers of the lock races and an upturned forward collar located inside the tubular extension and facing the forward side of the screw ring, a spring located in the tubular extension, around the prismatic rod and having a forward end bearing inside the tubular extension sleeve and a rear end pushing the collar and urging the rearward edge of the tubular push member against rollers of one of the lock races and binding means mounted in the sleeve, around the prismatic rod and resisting any rearward sliding movement of the sleeve along the prismatic rod.

3. A link of adjustable length, namely for use as an adjustor, said link comprising a tubular rod having a forward end, a cylindrical hollow body rigidly secured to said forward end and coaxial with the tubular rod, said hollow body having a rearward bottom and a forward circular inwardly turned flange having a rearward side inwardly in the hollow body, said circular inwardly turned flange encircling a large axial aperture of said hollow body, a prismatic rod having a head slidably engaged in the tubular rod and extending forward, axially in the hollow body and outwardly, through the circular aperture of the hollow body, a roller guiding cage slidably mounted around the prismatic rod and carrying rollers in engagement with the faces of the prismatic rod, a sloping race slidably mounted in the hollow body, opposite said rollers and having inner forward by diverging faces engageable with the rollers, first a spring bearing on the forward end of said tubular rod and urging the roller guiding cage forward, a plurality of spaced apart spacing rings, slidably mounted around the prismatic rod, on the forward side of the roller guiding cage, a set of rollers in engagement with the faces of the prismatic rod, in each of the spaces between said spacing rings, lock races, slidably mounted in the hollow body, each opposite to one of the sets of rollers and having inner rearward by diverging faces engageable with the rollers of said sets, a second spring located in the hollow body between the sloping race and the lock races and urging said lock races away from said sloping race, a sheath having an apertured bottom slidably engaged around the tubular rod and a cylindrical wall slidably engaged around the hollow body and having a forward circular edge extending beyond the circular inwardly turned flange of the hollow body, a sleeve rigid with said forward circular edge, the prismatic rod extending axially in and protruding forwardly beyond the sleeve, the sleeve having a rearwardly projecting tubular extension terminated in an end facing the lock races, a coil spring mounted inside the sheath, around the tubular rod and having a forward end bearing on the bottom of the hollow body and a rearward end pushing the bottom of the sheath rearwardly in respect to the hollow body and urging the end of the rearwardly projecting tubular extension of the sleeve against one of the lock races, and spacing said lock races rearwardly, apart from the rearward side of the circular inwardly turned flange of the hollow body, to a small clearance, when little or no action is exerted forwardly on the bottom of the sheath against the strong coil spring and releasing said lock races, then pushed against the rearward side of the circular inwardly turned flange of the hollow body, by the action of the spring located between said lock races and the sloping race, when an action exerted on the bottom of the sheath pushes said sheath forward in respect to the hollow body, to a distance up to the above named clearance, a screw ring rigidly engaged with and inside said end and having a forward side inwardly of the tubular extension, a tubular push member, slidably mounted around the prismatic rod, having a rearward edge facing rollers of the lock races and an upturned forward collar located inside the tubular extension and facing the forward side of the screw ring, a spring located in the tubular extension, around the prismatic rod and having a forward end bearing inside the sleeve and a rear end pushing the collar urging the rearward edge of the tubular push member against rollers of one of the lock races and setting the collar forwardly of the forward side of the screw ring at a distance which is greater than the above named clearance, when little or no action is exerted forwardly on the bottom of the sheath against the strong coil spring and releasing the rollers of the lock races, then pushed forwardly in their lock races by the action of the spring bearing in the bottom of the hollow body, when an action exerted on the bottom of the sheath pushes forwardly said sheath in respect to the hollow body to and extent up the above named few length, and binding means mounted in the sleeve, around the prismatic rod and resisting to any rearward sliding movement of the sleeve along the prismatic rod.

4. A link of adjustable length, namely for use as an adjustor, said link comprising a tubular rod having a forward end, a cylindrical hollow body rigidly secured to said forward end and coaxial with the tubular rod, said hollow body having a rearward bottom and a forward circular inwardly turned flange encircling a large axial aperture of said hollow body, a prismatic rod having a head slidably engaged in the tubular rod and extending forward axially in the hollow body and outwardly, through the circular aperture of the hollow body, a roller guiding cage, slidably mounted around the prismatic rod and carrying rollers in engagement with the faces of the prismatic rod, a sloping race slidably mounted in the hollow body, opposite said rollers and having inner forward by diverging faces engageable with the rollers, a first spring bearing on the forward end of said tubular rod and urging the roller guiding cage forward, a plurality of spaced apart spacing rings, slidably mounted around the prismatic rod, on the forward side of the roller guiding cage, a set of rollers in engagement with the faces of the prismatic rod, in each of the spaces between said spacing rings, lock races, slidably mounted in the hollow body, each opposite to one of the sets of rollers and having inner rearward by diverging faces engageable with the rollers of said sets, a second spring located in the hollow body between the sloping race and the lock races and urging said lock rolls away from said sloping race, a sheath having an apertured bottom slidably engaged around the tubular rod and a cylindrical wall slidably engaged around the hollow body and having a forward circular edge extending beyond the circular inwardly turned flange of the hollow body, a sleeve rigid with said forward circular edge, the prismatic rod extending axially in and protruding forwardly beyond the sleeve, the sleeve having a rearwardly projecting tubular extension facing the lock races, a coil spring mounted inside the sheath, around the tubular rod and having a forward end bearing on the bottom of the hollow body and a rearward end pushing the bottom of the sheath rearwardly in respect to the hollow body and urging the rearwardly projecting tubular extension of the sleeve against one of the lock races, telescopic resilient means mounted in the sleeve around the prismatic rod, protruding rearwardly of the tubular extension and engaging the rollers of one of the lock races, a roller guiding cage, rigid with the sleeve, slidably mounted around the prismatic rod and carrying rollers in engagement with the faces of the prismatic rod, a take up race, slidably mounted in the sleeve, opposite said rollers and having inner rearwards tapering faces engageable with said rollers, a ring, slidably mounted in the sleeve and having a rearward edge facing the take up race, and a spring, located in the sleeve, around the prismatic rod and having a forward end bearing in the sleeve and a rearward end pushing said ring and urging, by the forward edge of said ring the take up race against its rollers.

5. A link of adjustable length, namely for use as an adjustor as claimed in claim 4, wherein the roller guiding cage rigid with the sleeve is formed with longitudinal portions, each covering a face of the prismatic rod, said portions defining apertures each facing a pair of adjacent faces of the prismatic rod and the rollers carried by said cage being located by pairs in said apertures.

References Cited in the file of this patent

FOREIGN PATENTS

| | | |
|---|---|---|
| 60,894 | Denmark | Apr. 20, 1940 |
| 64,887 | Norway | Apr. 24, 1941 |
| 104,055 | Sweden | Mar. 24, 1942 |
| 383,549 | Great Britain | Nov. 17, 1932 |